United States Patent [19]

Komatsu

[11] 4,047,994

[45] Sept. 13, 1977

[54] PROCESS FOR MENDING CLOTHES

[76] Inventor: Shigeyoshi Komatsu, 7-20, 1-chome, Abenosuji, Abeno, Osaka, Japan, 545

[21] Appl. No.: 657,295

[22] Filed: Feb. 11, 1976

[30] Foreign Application Priority Data

Jan. 13, 1976 Japan .................................. 51-3462

[51] Int. Cl.² ............................................. B32B 35/00
[52] U.S. Cl. ........................................ 156/98; 264/36; 427/140; 428/63
[58] Field of Search .............. 156/98; 264/36; 428/63; 427/140

[56] References Cited

U.S. PATENT DOCUMENTS

| | | | |
|---|---|---|---|
| 3,271,217 | 9/1966 | Mapson | 156/98 |
| 3,513,048 | 5/1970 | Snyder | 156/98 |
| 3,558,385 | 1/1971 | Ronning | 156/98 |
| 3,713,926 | 1/1973 | Speer | 156/98 |
| 3,772,114 | 11/1973 | Kowaichuk | 156/98 |

FOREIGN PATENT DOCUMENTS

| | | |
|---|---|---|
| 671,727 | 5/1972 | Japan |
| 755,474 | 4/1974 | Japan |

*Primary Examiner*—Edward G. Whitby
*Attorney, Agent, or Firm*—Browdy and Neimark

[57] ABSTRACT

An improved process for mending clothes with a unique means for applying a thermoplastic synthetic resin to form a strong border between a basic cloth and a mending cloth. The resin is applied to both the mending cloth and the basic cloth before fastening them together. The cloths are then temporarily fastened together. The mending cloth is placed over the torn portion of the basic cloth and a hole is stamped through the two cloths. Additional resin is applied to the circumference of the hole and the piece of mending cloth which has just been cut out is manually pressed into the hole. A reinforcing cloth is placed on the back of the mended area and an iron is used to heat the resin and cause the various pieces of cloth to adhere. The mended area is difficult to distinguish and resists tearing or fraying.

3 Claims, 7 Drawing Figures

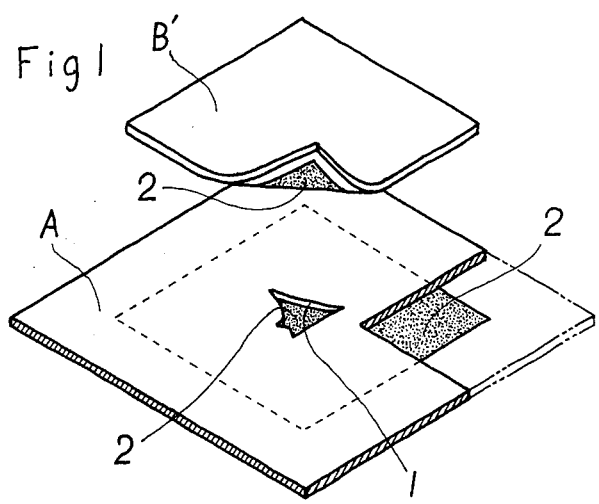
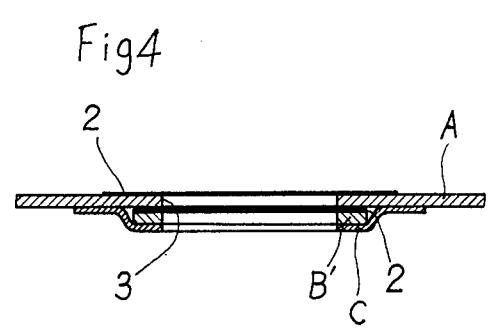
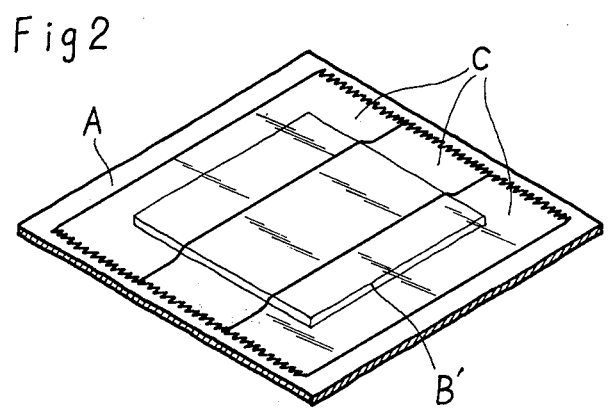
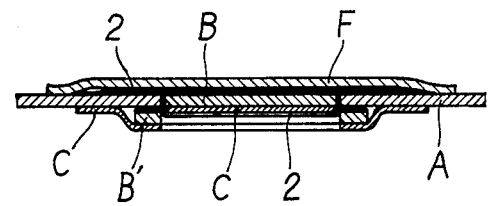
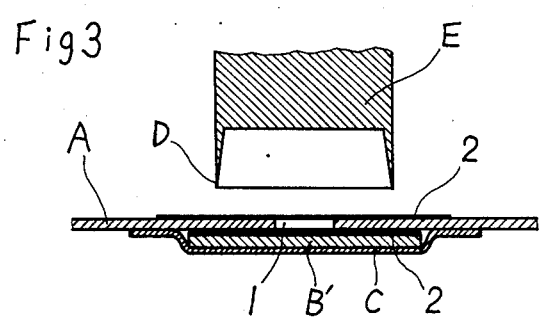
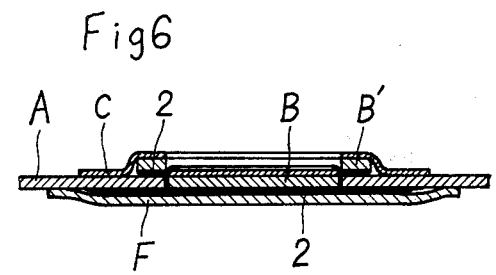
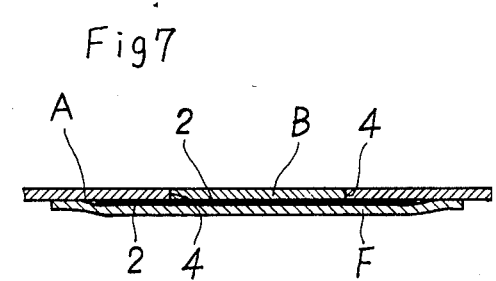

PROCESS FOR MENDING CLOTHES

FIELD OF THE INVENTION

This invention relates to a process for mending clothes, and more particularly, to a process for mending clothes which can easily be carried out without skillfulness and high technique and in which parts mended do not become frayed.

BACKGROUND OF THE INVENTION

The prior art (Japanese Pat. Nos. 671,727 and 755,474) comprises putting a mending cloth on a basic cloth to be mended, stamping out the basic cloth and the mending cloth together with a trimming die, fitting a fitting cloth made from the stamped out portion of the mending cloth into the hole which was previously stamped out, putting a thermoplastic synthetic resin film on the back of the fitting portion, and then heating said thermoplastic synthetic resin film surface through cellophane paper with an iron. The thermoplastic synthetic resin film is fused by heat-pressing with an iron. One part of the resin penetrates into the construction of the basic and mending cloths via gaps between fibers and the other part pentetrates through the gap between the basic cloth and the fitting cloth at the fitting portion. Thus, the basic and mending cloths are adhered strongly by fusion of the synthetic resin film. However, fused thermoplastic synthetic resin sometimes penetrates through the basic and mending cloths and oozes out of the surface. In such case, the appearance of the basic and mending cloths is remarkably spoiled and their texture becomes hard decreasing the practical value of the invention.

SUMMARY OF THE INVENTION

An object of this invention is to provide an improved process for mending clothes in which the basic cloth and the mending cloth are strongly adhered at the fitting portion, the warp and weft do not fray at the part mended, and the thermoplastic synthetic resin does not ooze out.

BRIEF DESCRIPTION OF THE DRAWING

FIG. 1 is a persepective view of a basic cloth A to be mended and a mending cloth B', to the backs of which a thermoplastic synthetic resin 2 has been adhered by fusion.

FIG. 2 is a perspective view of the mending cloth B' temporarily fastened on the basic cloth A.

FIG. 3 is a section view of the cloths which are stamped out by a trimming die E.

FIG. 4 is a section view of the thermoplastic synthetic resin film 2 adhered to the circumference of a hole 3 stamped out.

FIG. 5 is a section view to show a fitting cloth B pressed into the hole 3 which has been stamped out and a reinforcing cloth F adhered to the basic cloth and the fitting cloth.

FIG. 6 is a section view of the cloth illustrated in FIG. 5, the top surface of which has been turned upward.

FIG. 7 is a section view of the cloth which is completely mended.

DESCRIPTION OF THE PREFERRED EMBODIMENTS

Flaw 1 of a basic cloth A illustrated in FIG. 1 is to be mended. A thermoplastic synthetic resin film 2, for example, nylon film for adhering, is adhered by fusion on the back of the basic cloth A and to the back of a mending cloth B', by heat-pressing with an iron, to prevent fraying (FIG. 1). It is suitable to adhere the film 2, which is about one cm larger than the flaw 1, on the basic cloth A. The mending cloth B' with adjusted pattern, is taken to be about one cm larger than the flaw 1, and is cut in to a square after the film 2 is adhered. The mending cloth B' is put on flaw 1 of the surface of the basic cloth A, the pattern is adjusted, and then the basic cloth A is, temporarily fastened in place by a temporary fastening material C. Cellophane tape is usually used as the temporary fastening material C. The mending cloth B' is completely covered by cellophane tape and temporarily fastened on the basic cloth A (FIG. 2). The cloth is then turned over, with the back upward, and the basic cloth A and the mending cloth B' are stamped out together with a trimming die E having a sharp square or round edge D, as illustrated in FIG. 3. Referring to FIG. 4, a large hole 3 is penetrated on the basic cloth A from which the flaw 1 is removed, and a fitting cloth B which is adapted to fit the hole 3 of the basic cloth A, is formed from the mending cloth B'. The thermoplastic synthetic resin film 2 is put on the circumference of the hole 3, and is adhered to the basic cloth A by heat-pressing with an iron. The hole portion of the film 2 is cut in an X-shape to facilitate fitting of the fitting cloth B in the hole 3. The fitting cloth B is manually pressed into the hole 3 with the back of cloth B upward. A reinforcing cloth F is adhered by fusion to the basic cloth A and the fitting cloth B through their thermoplastic synthetic resin film layers 2 by light heat-pressing with the iron which does not effect the remainder of the cloth. It is usually suitable to heat-press with the iron at 140°-160° C for two-three seconds. A lining is usually used as the reinforcing cloth F (FIG. 5). Then, turning the surface upward, the remainders of the mending cloth B' and the temporary fastening material C which remain on the surface are removed. The surface is overlayed with a polyester film (not shown) and strongly heat-pressed with the iron at 140°-160° C for at least 30 seconds. By strong heat-pressing with the iron, any synthetic resin film 2 and temporary fastening material C which remain on the surface of the fitting cloth B are removed, moving to the polyester film successively, and, on the other hand, the basic cloth A and the fitting cloth B are completely adhered by fusion at the gap 4 of the fitting portion by the thermoplastic synthetic resin (FIG. 6 and 7). By heat-pressing the surface and back of the mended cloth with the iron, the adhering part increases in strength.

Since the basic cloth A and the fitting cloth B are completely adhered by fusion at the gap 4 of the fitting portion by the thermoplastic synthetic resin and, further, because the reinforcing cloth F is adhered by fusion to the back for reinforcing, the border between the basic cloth A and the fitting cloth B is strongly adhered and resists external forces such as wearing and dry cleaning, so that tearing or fraying of warp and weft never occurs. Oozing and hardening in texture, owing to the penetration of the resin, is not observed, and thus, disadvantages of the prior inventions have been overcome.

Clothes can be mended exquisitely and strongly so that the border between the basic cloth and the fitting cloth cannot be distinguished, without skillfulness and high technique.

What is claimed is:

1. A process for mending clothes which comprises:

adhering a thermoplastic synthetic resin film by fusion on the back of a basic cloth to be mended and on the back of a mending cloth to prevent fraying;

putting said mending cloth with said adhered film on the surface of said basic cloth with the film side downward to adjust pattern and temporarily fastening with a temporary fastening material which completely covers the mending cloth;

turning the cloths over to be back upward and stamping the clothes with a trimming die;

removing the basic cloth stamped out to leave the mending cloth which forms a fitting cloth;

putting a thermoplastic synthetic resin film on the circumference of the hole stamped out;

cutting the hole portion of the film in an X-shape to facilitate fitting of the fitting cloth in the hole;

fitting the fitting cloth in the hole with the back upward;

putting on a reinforcing cloth and adhering by fusion to the basic cloth and the fitting cloth through their thermoplastic synthetic resin film layers by light heat-pressing;

turning the cloths over and removing the remainders of the mending cloth and the temporary fastening material which remain on the surface of the basic cloth; and overlaying the surface of the cloth with a polyester film and strongly heat-pressing it to remove the synthetic resin film and the temporary fastening material which remain on the surface of the fitting cloth, the basic cloth and the fitting cloth being adhered by fusion at the border of the fitting portion by the thermoplastic synthetic resin.

2. The process for mending clothes as set forth in claim 1 wherein the thermoplastic synthetic resin film is nylon film for adhering.

3. The process for mending clothes as set forth in claim 2 wherein the temporary fastening material is cellophane tape.

* * * * *